United States Patent Office 3,321,184
Patented May 23, 1967

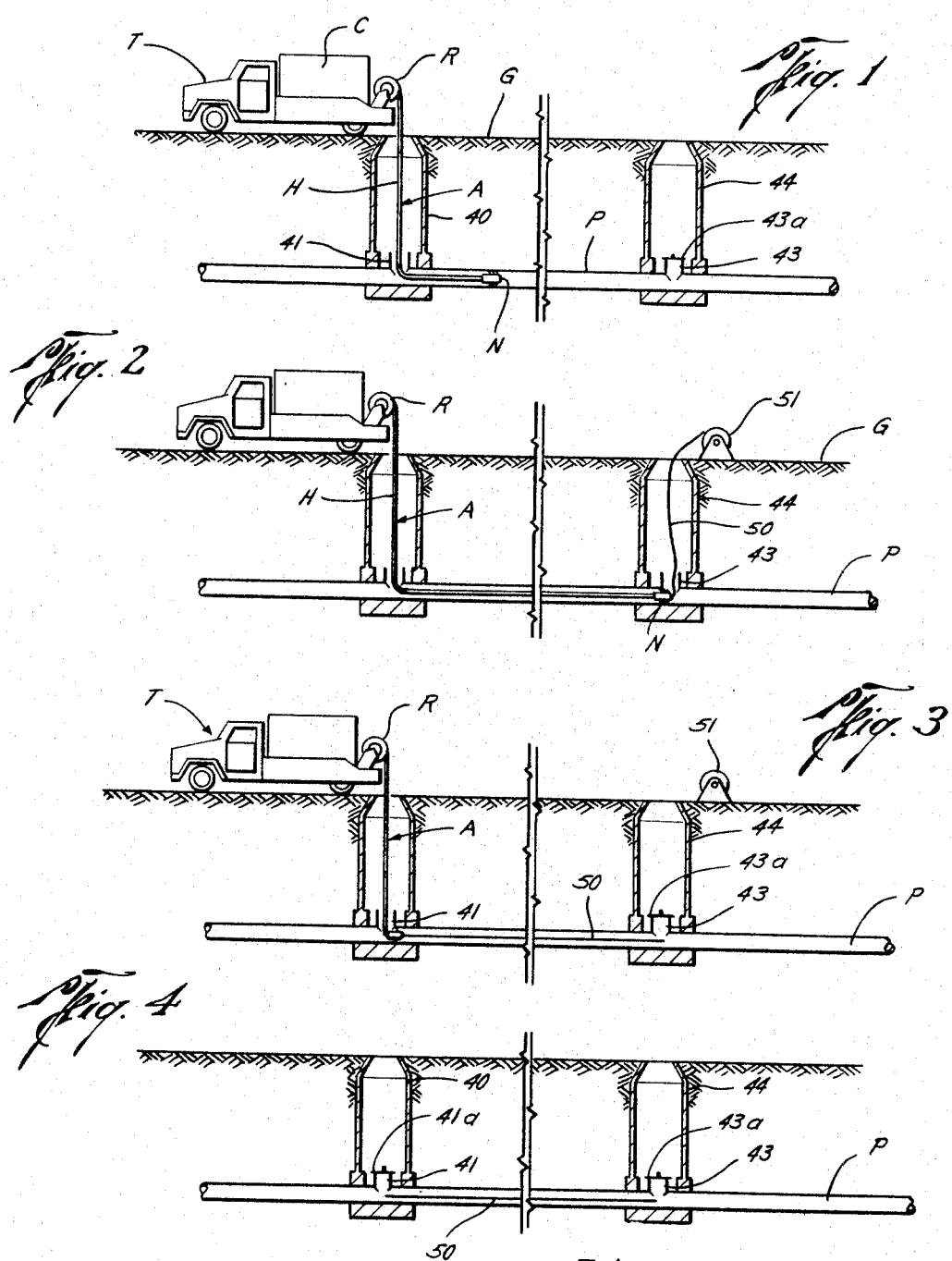

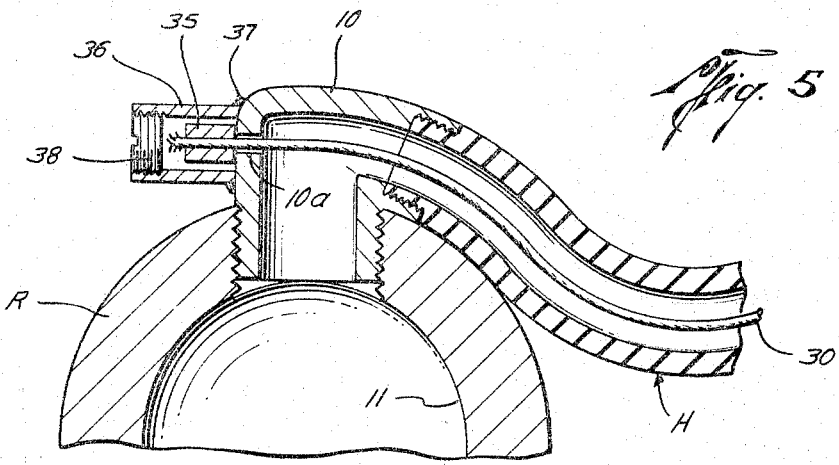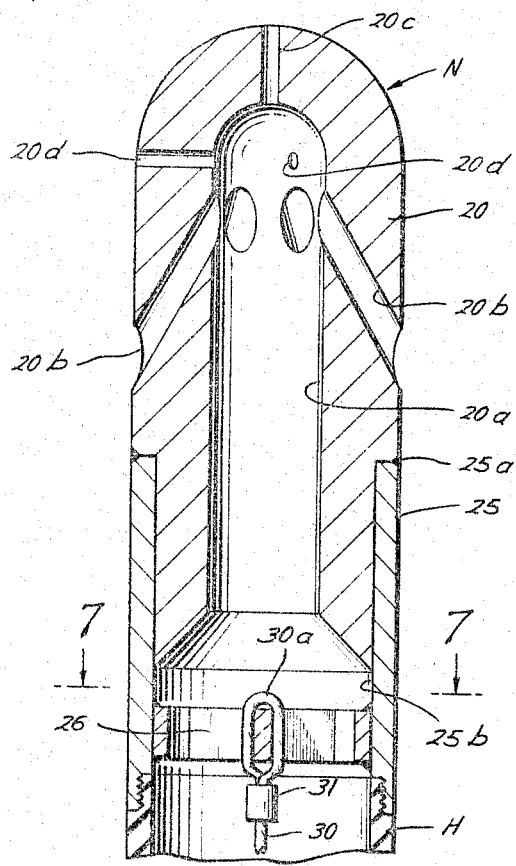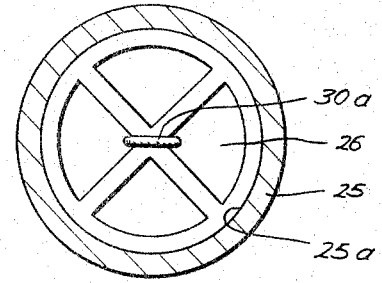

3,321,184
SELF-PROPELLING HOSE-NOZZLE ASSEMBLY
AND METHOD OF USING SAME
John B. Goss, 2606 Knoblock St.,
Houston, Tex. 77026
Filed Jan. 3, 1966, Ser. No. 518,231
10 Claims. (Cl. 254—134.4)

This invention relates to new and useful improvements in self-propelling hose nozzles and methods of using same.

It is well known that hose nozzles can be so constructed that at least a portion of the fluid discharged therefrom is utilized in propelling the nozzle and the hose therewith in a desired direction within a pipeline or the like. Examples of such prior art are United States Patents Nos. 1,176,518, 1,628,070, and 3,080,265.

It is an object of this invention to provide a new and improved self-propelled hose-nozzle assembly and method of using same wherein means are provided with the hose and nozzle for preventing a rupture of the hose when a pull is exerted thereon in retrieving the nozzle after it has been propelled a certain distance.

Another object of this invention is to provide a new and improved method of using a self-propelled hose-nozzle assembly for introducing one or more cords or lines into a pipeline so that such cord or line may be subsequently used for various operations such as towing a television camera through the pipeline, pulling a cleaning plug, or pulling a closure plug to a desired point for closing the pipeline.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIGS. 1–4 are views in elevation, schematically illustrating the preferred series of steps of the method of this invention;

FIG. 5 is a sectional view illustrating the inlet end of the flexible hose and the cable therewith forming a part of the hose-nozzle assembly of the present invention;

FIG. 6 is a sectional view of one type of nozzle having a cable connected thereto for use in conjunction with the hose-nozzle assembly of this invention; and FIG. 7 is a view taken on line 7—7 of FIG. 6 to further illustrate the construction of the nozzle and the connection of the cable within the hose to such nozzle.

In the drawings, the letter A designates generally the hose-nozzle assembly of this invention (FIGS. 1–3). Such assembly A includes a nozzle N which is of the self-propelling type, as will be explained. Such nozzle N is connected to a flexible hose H which extends to a reel R or other suitable equipment for controlling the retrieval and the unwinding of the hose H when the nozzle N is to be retrieved or propelled forwardly. The reel R is preferably mounted on a suitable truck T which has a tank or compartment C with water or other fluid therein to be supplied to the hose H for discharge at the nozzle N, as will be more evident hereinafter.

In the preferred form of the invention, the hose-nozzle assembly A has the inlet end of the hose H threaded or otherwise connected to an elbow or other pipe fitting 10 (FIG. 5). The elbow or other fitting 10 is threaded or otherwise connected to the reel R so that water or other fluid may be supplied from the bore 11 of the reel R into the elbow 10 and thus to the inlet of the hose H. The bore 11 of the reel R is connected by suitable piping to the source of water or other fluid in the container or tank C. Normally, the water or other fluid is pumped to the inlet of the hose H from the tank C by means of a pump also located on the truck T at pressures of from about five hundred pounds per square inch to about twelve hundred pounds per square inch, and preferably with a pump capacity of about seventy-five gallons per minute.

At the outlet end of the hose H, the nozzle N is connected by any suitable means. In the preferred form of the invention, the nozzle N includes a head 20 which has a bore 20a in communication with the discharge end of the hose H and also in communication with outwardly and rearwardly directed passages or ports 20b, a forwardly directed port or ports 20c, and laterally directed ports 20d. The fluid which is thus caused to flow through the hose H from the inlet fitting 10 to the nozzle N is discharged through the ports 20b, 20c and 20d. Although the dimensions of the ports 20b, 20c and 20d may vary in accordance with the experience of those skilled in the art, it is preferable to provide six of the rearwardly and outwardly inclined ports 20b which are of approximately five thirty-seconds of an inch in diameter. Normally, only one forward port 20c is provided and it is approximately five sixty-fourths of an inch in diameter in the preferred form of the invention. The lateral or perpendicular ports 20d are preferably three or four in number and are also preferably five sixty-fourths of an inch in diameter. As will be more evident from the description hereinafter, the ports 20b serve to provide a jetting action which moves the nozzle N and the hose portion H connected therewith forwardly in a pipe line such as indicated at P in FIGS. 1–4, or any other similar tubular object. The forward nozzle 20c serves to remove obstructions or debris which may be ahead of the nozzle N as it is propelled forwardly by the jet action of the fluid discharged through the nozzles 20b. The fluid discharged through the openings 20d serves to maintain the nozzle N in a substantially centered position within the pipe line P as the nozzle N moves with respect thereto.

Although the hose H may be connected directly to the nozzle N, the present invention provides an additional sleeve 25 which is welded at 25a to the nozzle N. The sleeve 25 has a spider 26 welded in its bore 25b (FIGS. 6 and 7) to which is connected one end of a cable 30 formed of steel or other high strength material. The end of the cable 30 is looped as indicated at 30a around the center portion of the spider 26 and is clamped with any suitable type of swaged ring or clamp 31. The cable 30 extends throughout substantially the full length of the hose H and the other end thereof is connected in proximity to the inlet to the hose H (FIG. 5).

Thus, as illustrated in FIG. 5, the cable 30 extends through a suitable opening 10a in the elbow or fitting 10. A swaged ring or other suitable ring 35 having a diameter larger than the diameter of the opening 10a is connected to the cable 30 externally of the fitting 10 so as to secure the end of the cable 30 to the fitting 10. In order to provide a water-tight closure, the ring 35 with the end of the cable 30 connected thereto is disposed in a sleeve 36 which is welded at 37 or is otherwise suitably attached to the fitting 10 so as to surround the opening 10a externally thereof. A closure plug 38 is threaded or otherwise disposed at the outer end of the sleeve 36 for sealing the sleeve 36 and preventing fluid from escaping therefrom. A closure plug 38 may be removed readily by unthreading same so as to repair or replace the ring 35 and the cable 30.

The cable 30 is preferably mounted in the hose H with substantially no slackness so that when a pulling force is exerted on the hose H, the cable 30 will receive such pulling force and prevent further elongation or pull on the hose H, thereby preventing a rupture of the hose H.

The presence of the cable 30 is especially important in the retrieving of the hose H and the nozzle N by a winding of the hose H on the reel R. For example, if the pipe line P as an accumulation of solids or other obstructions which interfere with the retrieval of the hose H and the nozzle N therewith, an excessive end pull is exerted on the hose H which has heretofore caused rupture and other types of damage to the hose H. With the present invention, the cable 30 takes such end pull loads and prevents excessive end pull forces acting on the hose H since its is basically formed of rubber or other materials which cannot withstand the end pull forces encountered.

In carrying out the method of this invention, using the apparatus A of this invention, the truck T with its equipment is disposed adjacent a first manhole 40 (FIG. 1) which extends downwardly from the ground level G to the pipe line P. A suitable first opening 41 into the pipe line P is provided in a conventional manner so as to admit the nozzle N into the pipe line P. The nozzle N is then directed in the direction in which the nozzle is to travel in the pipe line P, and the water or other fluid under pressure is introduced through the hose H to the nozzle N. Due to the self-propelling action caused by the jet force from the inclined passages 20b, the nozzle N travels through the pipe line P from the first opening 41 to a second opening 43 within a second manhole 44. The opening 43 is shown with a removable cover 43a which is schematically illustrated since it is of conventional construction and would be left in place until the nozzle N had propelled itself to a point in proximity to the opening 43.

As illustrated in FIG. 2, when the nozzle N has moved to a point in proximity to the opening 43, the fluid being supplied to the hose H is cut off, and the cover 43a is removed. At that time, a cord or line 50 which is preferably formed of nylon, steel or similar materials is unreeled from a storage reel 51 at the ground level G and one end thereof is connected to the nozzle N by tying a knot or by a suitable clamp (not shown). After the free end of the cord or line 50 is connected to the nozzle N, the reel R is operated to wind the hose H thereon and so as to retrieve the hose H and the nozzle N back to the first opening 41. Fluid under pressure may be discharged from the nozzle N during the retrieval of the hose H and nozzle N, and in such case, the presence of the cable 30 is especially important because of the restraining force exerted on the hose H by the fluid from the inclined ports 20b which might otherwise cause a rupture of the hose H. Since the cord or line 50 is attached to the nozzle N during the retrieval, the cord or line 50 (FIG. 3) is positioned in the pipe line P from the second opening 43 to the first opening 41. The operator may then sever or cut the line 50 so as to leave a section of the cord or line 50 in the pipe line P for subsequent operations. The cover 43a is then placed upon the opening 43, the nozzle N is then fully retrieved from the pipe line P and the truck T may move to another location. The opening 41 is preferably then closed with the conventional cover or cap 41a so that the cord or line 50 is left in the pipe line P extending from the opening 41 to the opening 43 (FIG. 4). As illustrated in FIG. 4, both the truck T and the reel 51 may then be removed from their respective positions over the manholes 40 and 44 and the cord or line 50 may be left in the pipe line P for an indefinite period of time so that subsequent operations may be performed therewith, as will be more fully explained.

The truck T may move to a third manhole and opening in the pipe line P (not shown), and the procedure described in connection with FIGS. 1–4 may be repeated. Thus, an additional length of line 50 may be disposed in the pipe line P so that it can be connected to the portion of the cord or line 50 therein so that a continuous cord or line 50 extending from the second opening 43 to a third opening (not shown) is thus provided. It will be appreciated that the procedure thus described may be repeated for successive manholes to provide any desired length of cord or line 50 within the pipe line P.

The cord or line 50 has numerous uses. For example, the line may be attached to a television camera for pulling same from one manhole to another so as to obtain a scan view of the inside of the pipe line. In some instances, it is desirable to pull a cleaning pig through the pipe line P, and if this is desired, the end of the cord 50 may be attached to a pig at one of the manholes and it may be pulled through the pipe line to the other end of the cord at another manhole. Also, a plugging device may be connected to one end of the cord 50 and pulled to an intermediate position between manholes for closing a line to repair same or for performing similar operations.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A self-propelling hose-nozzle assembly, comprising:
   (a) a flexible hose having a fluid inlet end and a fluid discharge end,
   (b) a nozzle mounted on the fluid discharge end of said hose,
   (c) said nozzle having rearwardly and outwardly directed openings for discharging therefrom at least a portion of the fluid introduced into said hose to thereby propel the nozzle and the hose therewith forwardly, and
   (d) a cable mounted in said hose for preventing a rupture of said hose when a pull is exerted thereon in retrieving the hose and nozzle.

2. The structure set forth in claim 1, including:
   (a) means for securing one end of said cable to said nozzle, and
   (b) means for securing the other end of said cable in proximity to the inlet end of said hose.

3. The structure set forth in claim 1, including:
   (a) a reel adapted to wind the hose thereon,
   (b) an inlet fitting mounted on said reel and connected to said fluid inlet end of said flexible hose for flowing fluid into the hose,
   (c) means for securing one end of the cable to said inlet fitting, and
   (d) means for securing the other end of the cable to said nozzle.

4. The structure set forth in claim 1, including:
   (a) a reel adapted to wind the hose thereon,
   (b) an inlet fitting mounted on said reel and connected to said fluid inlet end of said flexible hose for flowing fluid into the hose,
   (c) means for securing one end of the cable to said inlet fitting,
   (d) means for securing the other end of the cable to said nozzle, and
   (e) the length of said cable being substantially equal to the length of said hose.

5. A method of using a self-propelling hose-nozzle assembly, comprising the steps of:
   (a) introducing the nozzle of the hose-nozzle assembly into a pipeline at a first opening,
   (b) propelling the nozzle and hose therewith along the pipeline to a second opening,
   (c) attaching a first cord or the like to the nozzle at the second opening,
   (d) retrieving the nozzle with the cord or the like back to the first opening, and
   (e) thereafter detaching the cord or the like from the nozzle.

6. The method set forth in claim 5, including the additional steps of:
   (a) subsequently introducing the nozzle of the hose-nozzle assembly into a third opening, (b) propelling the nozzle and hose therewith along the pipeline to the first opening,
(c) attaching a second cord or the like to the nozzle at the first opening,
(d) retrieving the nozzle with the second cord or the like back to the third opening, and
(e) thereafter detaching the second cord or the like from the nozzle.

7. The method set forth in claim 5, including the additional step of:
(a) discharging fluid outwardly and rearwardly from the nozzle for propelling the nozzle.

8. The method set forth in claim 5, including the additional steps of:
(a) discharging fluid outwardly and rearwardly from the nozzle for propelling the nozzle, and
(b) discharging fluid outwardly and rearwardly from the nozzle while retrieving the nozzle back to the first opening.

9. The method set forth in claim 5, including the additional steps of:
(a) subsequently introducing the nozzle of the hose-nozzle assembly into a third opening,
(b) propelling the nozzle and hose therewith along the pipeline to the first opening,
(c) attaching a second cord or the like to the nozzle at the first opening,
(d) retrieving the nozzle with the second cord or the like back to the third opening,
(e) thereafter detaching the second cord or the like from the nozzle, and
(f) joining the first cord to the second cord in the pipeline.

10. The method set forth in claim 5, wherein:
(a) said first opening is a vertical shaft communicating with said pipeline, and
(b) said second opening is a vertical shaft remote from said first opening and also communicating with said pipeline.

References Cited by the Examiner
UNITED STATES PATENTS 1,717,986   6/1929   Liebau _____ 15—104.12
2,735,794   2/1956   Pletcher _____ 134—24

OTHELL M. SIMPSON, *Primary Examiner.*